United States Patent Office  
3,235,324  
Patented Feb. 15, 1966

3,235,324
BOILER PROTECTION
Wayne R. Merriman, Midland, Mich., assignor to The Dow Chemical Company, Midland, Mich., a corporation of Delaware
No Drawing. Filed Sept. 25, 1964, Ser. No. 399,397
3 Claims. (Cl. 21—2.7)

The present invention is concerned with the protection of industrial steam boilers from injury through, on the one hand, corrosion and, on the other hand, the deposit of mineral substances upon heat-transfer surfaces.

In the effort to achieve greater efficiency in industrial boilers for the production of steam for industrial energy purposes, the trend of boiler design has been toward higher and higher operating pressures and temperatures. Careful studies have been made of the heat-transfer properties of structural metals, notably steels, with especial regard for the temperature gradient across the thickness of wall of a pressure-confining heat-transfer boiler member, typically a tube. Commonly, such tubes operate with one surface adjacent a heat source which is at a temperature substantially above the plastic temperature of steel, and the other surface at a lower temperature, as high as is possible to maintain with safety, while simultaneously effecting heat transfer through the wall of the said tube or the like at a rate which prevents the plasticizing and pressure deformation of the said tubes. As the steam pressure increases and the temperature gradient between the heat source and the steam zone decreases, it becomes imperative that heat transfer be efficient and rapid lest, failing of such transfer, the heat exchange unit structure becomes overheated and suffers plastic deformation and eventually, perhaps, rupture. In this situation, the deposit, on the water or steam side, of minerals in an insulating layer which impede heat transfer, even modestly, is intolerable.

The problem is particularly exaggerated in the instance of boilers used to supply steam to installations which may return no condensate to the boiler, so that all incoming water is new, or "make-up" water in the sense that it has not previously been, in effect, distilled by passage through the boiler. In this situation, there tends to be a gradual accumulation of minerals capable of forming intolerable deposits.

The removal of minerals from water to be used in boilers has been carefully studied. Installations making use of all of the best available techniques typically begin by treatment of the incoming untreated water with any of numerous flocculating or "settling" agents whereby to remove from the water substantial quantities of turbidity impurities, and leave a relatively clean water. This clean water is typically passed through filters to remove all possible suspended or settling particles. The filtered water is then, in superior facilities, passed through beds of sodium cycle ion exchange resins, or, better, successively through beds of opposed signs, whereby the water is essentially deionized. However, various serious problems persist despite all these processes. As one of the remaining problems, clay, which is often a montmorillonite clay, a complex silicate of calcium, magnesium, and aluminum, as a colloid can pass unmodified through all these processes, and, by reason of various properties such as the absence from the particles of an electrical charge and their submicroscopic particle size, they are not removed in any technique now readily available, but pass on into the boiler water unmodified.

If the colloidal clay remained in colloidal suspension in the boiler, it would be expected to do little or no harm. However, at boiler temperatures it tends to break up yielding within the boiler calcium++, magnesium++, aluminum+++, and silicate— — ions in the boiler water. Further, these ions recombine under boiler conditions yielding various mineral substances. Of them, one of the most troublesome is a complex aluminum silicate of known structure which, when it occurs in nature, is called analcite. By reason of its mechanical hardness, its good thermal insulating properties, and its inertness to such substances as inhibited hydrochloric acid, analcite, as a boiler deposit, is very difficult to remove. Thus, by the presence of colloidal clay and its subsequent breakdown, all methods hitherto known for purification of water prior to its admission to the boiler have been unsatisfactory.

The problem has been mitigated to some extent by the employment of known chemical additives. Various phosphates, any of which, under boiler conditions, becomes converted to an ortho phosphate of some kind, are added because they tend to form complexes with calcium and maintain it in some form in the nature of a suspension. However, when a phosphate is employed alone and at pH of about 0 to 10.5, protection from calcium may be achieved but a tenacious adhesive magnesium phosphate tends to form and develop an insulating coating on the interior (water) surface of the boiler tubes in an intolerable degree.

Magnesium as a problem is mitigated to some extent by inclusion of sodium hydroxide in the boiler water. At a pH which may be in the neighborhood of 11, the hydroxide ion is sufficiently abundant that magnesium predominantly forms magnesium hydroxide, while silica and aluminum are maintained in the form of silicates and aluminates.

With these additions, the problem can be further mitigated by "blow down," that is to say, periodical or continuous removal from the boiler water, at a point of maximum concentration of solids, of a small part of the boiler water whereby some of the mineral components are removed. The point of greatest solids concentration from which blow down is typically taken is the point at which steam as a gas is finally separated from water as a liquid. In many large, industrial boilers this commonly takes place in a structure near the top of the boiler called a "steam drum."

A further and related problem of boiler maintenance has been the corrosion of iron and steel boiler tubes by oxygen in the presence of water. Various efforts are made to remove oxygen from the boiler water. In one method that is standard practice in large industrial boilers, the water, before admission to the boiler, is passed into a vessel whereinto live steam is injected under modest pressure. The water temperature is elevated whereby the solubility of oxygen is reduced, and the steam, in passing through, sweeps from the water most of the dissolved gases formerly present. However, after this treatment has been carried forward exhaustively, damaging traces of oxygen usually remain. These traces are frequently "scavenged" chemically. This is accomplished by adding to the boiler water a chemical which will react with the oxygen to bind it chemically and obtain a resulting reaction product that is harmless, or at least less harmful than the uncombined oxygen. The two most commonly used such substances are hydrazine and, preferably, sodium or other alkali metal sulfite. These substances, such as sulfite, are typically added as concentrated aqueous solution to the boiler through a "chemical feed line" whereby this and other chemical substances previously mentioned are introduced in more or less uniform concentration into the steam drum where the agitation of ebullition quickly disperses them uniformly into the boiler water. Also, sometimes, the oxygen scavenging chemical is introduced into the make-up water feed line to the boiler after steam deaeration, as noted.

Despite all these attempts to maintain boiler water in a condition which, on the one hand, will not contribute to corrosion and, on the other hand, will avoid deposition of insulating mineral substances, problems of mineral deposits, such as that from montmorillonite clay colloids, as noted, have persisted.

Recently, in the attempt to solve the remaining problem of mineral deposits, chelating agents have been included in the chemical feed to the boiler steam drum in the hope that, by reaction with metallic ions, they would form water-soluble organometallic chelates of the objectionable mineral substances. The most widely used and most successful has been the tetrasodium salt of ethylenediaminetetraacetic acid. The inclusion of this substance in the chemical feed line through which are added also, typically, sodium hydroxide and a phosphate, has yielded good results in terms of protection of boiler interiors from formation of mineral deposits. However, in some way that has not been completely understood, the introduction of the ethylenediaminetetraacetic acid in the chemical feed line, alone, or in a 2 or 3-component chemical mixture of sodium hydroxide, phosphate, and chelating agent, has caused severe corrosion. Not only has chemical feed line corrosion been a problem, but the structures within the boiler adjacent the chemical feed line inlet have been damaged. Such corrosion may be related to the fact that water used as solvent in the chemical feed is not usually deaerated. The severity of the problem is recognized when it is understood that the chemical feed line and adjacent boiler structures and fittings typically in the interior of the steam drum of the boiler, are under full boiler pressure, typically on the order of a thousand pounds per square inch. In this situation, more than minimal corrosion is intolerable and the replacement of corroded structures require the disusing of the entire boiler.

In the attempt to overcome the corrosion problem, the chelating agent has been introduced, not by the chemical feed into the steam drum, but into the inlet water feed, following the inlet water regulator mechanism, along with the sulfite as previously noted, as oxygen scavenger. This practice has resulted in excellent control of the accumulation of intolerable mineral deposits within the boiler, but has in some way resulted in severely enhanced corrosion of the metal parts of the boiler as well as chemical destruction of part of the chelating agent. Thus, up to the time of the present invention, those skilled in the art have had no way of availing themselves of the demonstrated efficacy of a chelating agent, notably the tetrasodium salt of ethylenediaminetetraacetic acid, without some concomitant corrosion problem of severity that is in some way enhanced by the use of the chelating agent.

It is known that the oxidation of sulfite, such as sodium sulfite, to sulfate, takes place only in the presence of heavy metal ions of which representative metals are cobalt, manganese, iron, and copper. The traces of these substances commonly found in boiler waters are now known sometimes to be satisfactory; sometimes the sulfite is made available commercially with added catalytic amounts of one or more of these substances. Typically, these metals are provided as the metal compounds of acids; and it has been assumed that the identity of the acid moiety was not critical.

When the catalytic metals are present in catalytic amounts, whether naturally or by addition, reaction to scavenge oxygen and form sulfate takes place under boiler feed water conditions in a very short time.

However, I have newly discovered that when these catalytic metals react with ethylenediaminetetraacetic acid, or the tetrasodium salt thereof, the resulting compounds are devoid of the necessary catalytic effect. This discovery explains the oxygen corrosion of boilers and related structures from the employment simultaneously of sulfite for oxygen scavenge and chelating agent for mineral control.

Now that this effect has been discovered, it is possible, and I have discovered, that both sulfite oxygen scavenge and mineral control by a sodium salt of ethylenediaminetetraacetic acid can be successfully achieved by means of the process which comprises the step of introducing an oxygen scavenging amount of alkali metal sulfite into the at least partially deaerated boiler feed water, allowing an oxygen scavenging reaction time to elapse, and thereafter adding to the resulting feed water an amount of a sodium salt of ethylenediaminetetraacetic acid, as chelating agent.

This sodium salt of the chelating agent acid is essentially harmless of itself, and the amount to be employed is critical, if at all, only in terms of results desired to be achieved. When it is desired to render soluble and harmless all the typical deposit-forming mineral substance present in the feed water, it will be necessary to supply the said sodium salt in the manner hereinbefore described in an amount that is approximately stoichiometric with the amount of polyvalent metal ion contaminant. The stoichiometry is easily calculated by reckoning that one molecule of a sodium salt of ethylenediaminetetraacetic acid chelates and inactivates one polyvalent metal ion such as those of magnesium, calcium, iron, aluminum, and other boiler deposit-forming cations irrespective of ion valence.

The present process is easily modified to provide not only the inactivation of deposit-forming polyvalent metal ions present in the feed water, but also to provide the removal, gradually and harmlessly, from the boiler interior, of mineral deposits accumulated under older and less effective forms of boiler treatment. This is done by supplying the sodium salt, in the manner indicated hereinbefore with relation to the supply af alkali metal sulfite, in an amount that is approximately stoichiometric with the concentration of contaminant polyvalent metal ions in the boiler water itself, as over against the feed water. In this situation, typically, polyvalent metal ions in the boiler water form the ethylenediaminetetraacetic acid salt whereby they are rendered soluble. The water thus improverished of such ions tends to pick up a fresh supply of polyvalent metal ions by partially dissolving existing deposits. These fresh ions, in turn, are solubilized, as noted, by the presence of further sodium salt of ethylenediaminetetraacetic acid. Hence, to maintain a supply of the said sodium salt that is approximately stoichiometric with polyvalent metal ion boiler water contaminants may require the successive and continuing introduction of amounts of such sodium salt for so long as removal of deposits actively continues, or is desired. The presence of polyvalent metal ion contaminants is readily ascertained in known boiler water analysis procedures, and the requisite addition of the said sodium salt in the manner of the present invention is readily adjusted accordingly. Accumulation of the soluble and unobjectionable polyvalent metal salts of ethylenediaminetetraacetic acid is controlled, typically, by regulating the blow down rate.

When the present invention is practiced, the alkali metal sulfite effectively scavenges oxygen at a time and location in the feed water supply which provides the presence of a catalytic amount of polyvalent metal ion in a form necessary for catalysis of the scavenging action, and sulfite is converted to sulfate in an amount stoichiometric with one or the other of oxygen concentration or sulfite concentration. Thereafter, the catalytic metal ions are solubilized and inactivated by the chelating agent.

It is noted that, heretofore, as analysis for scavenge of oxygen, it has sometimes been the practice to analyze boiler water for the presence of unreacted sulfite. Its presence has been taken as assurance that oxygen had been removed. In practicing the present invention it is much preferred to analyze, not for unreacted sulfite, but for oxygen. Thus a positive, not inferential, analysis is made.

The oxygen scavenge time required for oxygen scavenging before addition of the chelating agent varies according to, among other factors, water temperature, oxygen concentration, sulfite concentration, thoroughness of mixing, and identity and concentration of catalytic metal ions. Typical durations of oxygen scavenging reaction time vary from a minimum of about 0.1 second, or sometimes two or three seconds, to a maximum of about ten minutes. Under exceptional conditions, such as treatment of water in storage, longer or shorter times can be employed. From two to thirty seconds is most nearly typical of good industrial practice. Upon the completion of such oxygen scavenging time, under conditions favorable for oxygen scavenging, the sodium salt of ethylenediaminetetraacetic acid is introduced and effectively functions to solubilize mineral substances without reversing the oxygen scavenge.

The efficacy and completeness of oxygen scavenge, as a precondition to adding chelating agent, is readily ascertained by known methods of sampling of deoxygenated water and analyzing for remaining oxygen. In a typical industrial installation, duration of such time may often be converted into a correlated length of feed water pipe through which water flows at a known and uniform rate: spacing apart of sulfite feed and of chelating agent feed at a predetermined distance usually effects the desired timing.

In excellent boiler management it is uniformly desired to maintain upon the water surfaces of the boiler an essentially monomolecular layer of magnetite, $Fe_3O_4$ for its corrosion-inhibiting action. It has been ascertained in laboratory studies and in industrial boiler practice that the employment of a sodium salt of ethylenediaminetetraacetic acid in the manner described in the present invention does not remove this magnetite film. Thus, the present invention appears to offer the best method now known for the protection of boilers from deposit of mineral substances, from corrosion, and from loss of protective magnetite film.

In practicing the present invention, ethylenediaminetetraactic acid itself can be used, but it is of very low solubility in water and in amounts necessary would have to be handled as a slurry. The monosodium salt of ethylenediaminetetraactic acid is not known to exist. However, the present invention is readily practiced by the employment of the disodium salt, the trisodium salt, or the tetrasodium salt of ethylenediaminetetraactic acid, or any mixture of the three. When, in typical boiler water management, the pH of the water is maintained in the range of about 9.5–11, the salts other than the tetrasodium salt are promptly converted at least partially to either that form, or to a polyvalent metal chelate.

Other alkali metal salts of the said acid can also be employed, but they are more expensive than the sodium salt and have no advantage; and so, are not preferred.

The present invention has been practiced with several large industrial boilers under full industrial load and over extended operating times with excellent results. The following example sets forth the best mode now known to the inventor of practicing the present invention.

A petrochemical production plant employing four oil-fired water-tube boilers, two Foster-Wheeler and two Wickes, each with a capacity of about 100,000 pounds steam per hour, under about 650 pounds pressure per square inch gauge, with a high proportion of make-up (intake of new, rather than condensate, water), supplies water to these boilers as follows:

Water from the water main is conveyed to a gravity storage tank of which the chief function is as a pressure breaker to provide safety of the main in the event of back-up from a steam boiler. Water is run from there through a steam-energized pre-heater and warmed to about 90° F. and at this temperature is pumped into a primary softener. In this device, soda ash and lime are added, whereby various hardness minerals are precipitated. Thereafter, it is filtered, in the present installation through three parallel filters. Thereafter, forwarding pumps drive the filtrate water through a sodium cycle ion exchange bed.

The resulting water is then deaerated in a steam deaerator, and then passed to a closed holding tank. Under boiler feed demand, water is withdrawn from this holding tank, and the velocity of flow in the withdrawal pipe is about four feet per second. Aqueous sodium sulfite is metered into the water at a first point on the withdrawal pipe and allowed therein to react with traces of oxygen, forming sodium sulfate. Thereafter, at a second point on the withdrawal pipe, about 15 feet from the said first point, representing a travel time of about four seconds, there is introduced a water solution of the tetrasodium salt of ethylenediaminetetraacetc acid. In the deoxygenated water, polyvalent metal ions are chelated by the salt of ethylenediaminetetraacetic acid.

The deoxygenated water, with polyvalent metal in chelated form, is then forced, by the boiler feed pump, into the feed water heater, and thence, through appropriate equipment, into the various boilers.

In this installation, about 325,000 pounds of water per hour is fed to the storage tank and processed through the described facilities. Approximately 8 percent is exhausted as "blow down," and approximately 300,000 pounds per hour is converted to steam at about 650 pounds per square inch gauge pressure.

Water from the main, as it enters this system, has a hardness of from 110 to 150 parts per million (expressed as $CaCO_3$) consisting mostly of calcium, and magnesium bicarbonates and chlorides.

After treatment up to the storage tank for deaerated water, the hardness has been reduced to one to two parts per million (expressed as $CaCO_3$), mainly $Ca(HCO_3)_2$. Also, aluminum and traces of other metals are present, as is silicate, in amounts of a few tenths of a part per million, and apparently derived from clay colloids.

To water moving at approximately the indicated rates and of the indicated analysis, there was added, about four seconds after introduction of aqueous sodium sulfite for oxygen scavenge, the tetrasodium salt of ethylenediaminetetraacetic acid, as an aqueous 38 percent by weight solution, in an amount representing about 4.8 pounds per hour of actual tetrasodium salt. This supplied about 15 parts tetrasodium salt of ethylenediaminetetraacetic acid per million parts of water: this was in stoichiometric excess of the amount needed to chelate and solubilize the polyvalent metal ions present, and reflected the fact that, in addition to treating incoming water, it was being used also to clean the boiler of deposits built up prior to the present treatment.

Several months after the installation of facilities and the beginning of the practice of the present invention, one of the four boilers was taken out of service, cooled, drained, and its interior structure closely inspected. In particular, inspection for oxygen corrosion was carried out in detail, and no evidence of oxygen corrosion was found. The water surfaces of the boiler showed excellent protective magnetite film. In the last previous inspection, the entire water surface of the boiler bore continuous, variable, thin to thick deposits. In the present inspection, patches of mineral deposit were found but, compared with the last previous inspection of the same boiler, were of smaller area, not continuous, and thinner.

During the said months of operation, steam samples were periodically condensed, collected, and analyzed; the composition of the steam was essentially unchanged as a result of the operation of the present invention. Liquid water samples were periodically taken from within the boiler and analyzed: none of the ethylenediaminetetraacetic acid moiety of the supplied salt had broken down in boiler operation.

Prior to the completion of the present invention, a similar boiler was similarly supplied with deaerated water that had been filtered and treated with ion exchange resin. In this boiler, the tetrasodium salt of ethylenediaminetetraacetic acid was introduced with other substances, including a sodium phosphate, as an undeaerated aqueous solution, through the conventional chemical feed line to the steam drum. A few weeks after beginning operation in this manner, leakage was noted, and the boiler taken out of service and inspected. The chemical feed line pipe within the steam drum had corroded off adjacent to the drum wall. Thereafter, inflowing chemical feed had run, essentially undiluted, down the interior wall of the steam drum from a point above the water line, and, as it did so, caused serious corrosion of the interior surface of the drum and of other fixtures and fittings therein. It was ascertained that the corrosion of the wall of the steam drum had weakened it to the point of incipient rupture, and had caused the leakage.

I claim:

1. In a method of protecting a steam boiler, of which at least one of the feed water and the boiler water at least occasionally contains polyvalent metal substances that, if untreated, would constitute polyvalent metal ion contaminants, the process which comprises, in the stated sequence, the steps of introducing an oxygen-scavenging amount of alkali metal sulfite into boiler feed water containing traces of oxygen and in the presence of polyvalent metal ions sufficient to catalyze reaction of alkali metal sulfite to alkali metal sulfate, allowing an oxygen scavenging reaction time to elapse, and thereafter to the resulting feed water adding an amount of a sodium salt of ethylenediaminetetraacetic acid.

2. Method of claim 1 wherein the amount of sodium salt of ethylenediaminetetraacetic acid is an amount approximately stoichiometric with amount of polyvalent metal ion feed water contaminants.

3. Method of claim 1 wherein the amount of sodium salt of ethylenediaminetetraacetic acid in an amount approximately stoichiometric with amount of polyvalent metal ion boiler water contaminants.

References Cited by the Examiner

UNITED STATES PATENTS 2,396,938   3/1946   Bersworth.

OTHER REFERENCES

Betz, Handbook of Industrial Water Conditioning, Fifth Ed., 1958, Betz Laboratories, Inc., Philadelphia, Pa., pp. 26, 29, 79, 94, 100, 101, 156 and 157 relied on.

MORRIS O. WOLK, *Primary Examiner.*

MICHAEL E. ROGERS, *Examiner.*